Figure 1:
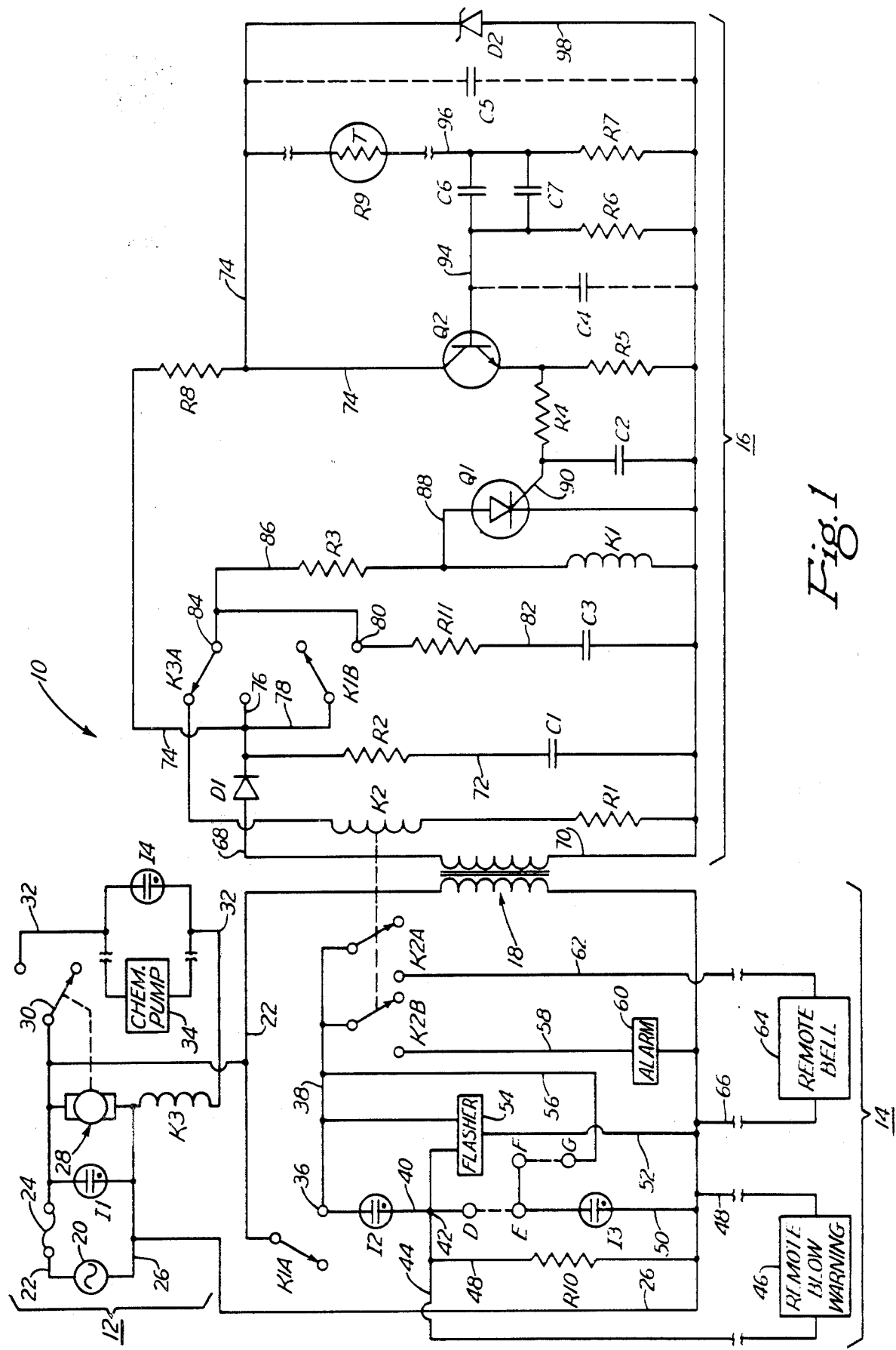

United States Patent [19]

Holdt

[11] 4,070,992
[45] Jan. 31, 1978

[54] BOILER BLOW DOWN CONTROLLER

[75] Inventor: Donald Holdt, Cambridge, Md.

[73] Assignee: Chemed Corporation, Cincinnati, Ohio

[21] Appl. No.: 679,696

[22] Filed: Apr. 23, 1976

[51] Int. Cl.² .................. F22B 37/54; F22B 37/42
[52] U.S. Cl. .................... 122/382; 122/504.2; 340/227 D
[58] Field of Search .......... 122/382, 504, 504.2; 236/91 G; 340/227 R, 227 D, 228 S

[56] References Cited

U.S. PATENT DOCUMENTS

| | | | |
|---|---|---|---|
| 1,606,915 | 11/1926 | Badger | 122/504.2 |
| 1,971,816 | 8/1934 | Hecht et al. | 122/504.2 |
| 3,044,049 | 7/1962 | Everett et al. | 340/227 D |
| 3,071,713 | 1/1963 | Duncan | 340/227 D |
| 3,117,311 | 1/1964 | Lemaire | 340/227 D |
| 3,377,994 | 4/1968 | Horne | 122/382 |
| 3,680,531 | 8/1972 | Holdt | 122/382 |
| 3,780,261 | 12/1973 | Eaton-Williams | 122/382 |
| 3,861,624 | 1/1975 | Lear | 236/91 G |
| 3,999,079 | 12/1976 | Chikuma | 340/227 D |

Primary Examiner—Kenneth W. Sprague
Attorney, Agent, or Firm—William Kovensky; William W. McDowell, Jr.

[57] ABSTRACT

A combined timer, blow down warning device, chemical pump, and controller for boilers. The circuit comprises an electro-mechanical array of relays, flashing lights and alarms and an electronic tripper which operates from the rate of change in temperature in the blow down tailpipe, to turn off the lights and alarms only after a manual blow down operation has been performed.

18 Claims, 2 Drawing Figures

BOILER BLOW DOWN CONTROLLER

The present invention pertains to steam boilers, and more in particular it pertains to a new circuit to warn the operator of the need for performing the manual blow down operation, while, optionally, at the same time controlling the chemical pump associated with the boiler.

Proper water treatment for steam boilers generally comprises two operations. Chemicals must be added along with makeup water, and secondly the boiler must be periodically blown down in order to avoid excessive buildup of solids and other undesirable matter. These solids and other materials accumulate as time goes on, and failure to remove them by blowing down the boiler can render the boiler unsafe and/or can damage it, and, in extreme cases, can cause an explosion.

In the prior art, the manner of adding chemicals into the boiler water has sometimes proved unsatisfactory. One way is to run the pump at low volume continuously. This system requires a valve to be opened only slightly for long periods of time, which is an inefficient and poor way to operate a valve. The second system, also used by the present invention, is to provide a time clock to periodically pump pre-determined amounts of necessary chemicals. Thus, the chemical pump runs only for a small pre-determined percentage of the total boiler operating time.

The second aspect of boiler operation concerns blow down. The law today requires, and each steam boiler made presently has, a so-called bottom blow down line. This is located at or near the lowest point in the boiler which contains water. It is this line which must be blown down or flushed periodically. By law, this flushing or blowing down must be done manually. The problem is that the same operater is not on the job continuously, 24 hours a day, 7 days a week. Frequently, therefore, the blow down chore falls to another person whose main duty is not attending the boiler. As a result, the responsibility grows "fuzzy," with the net result being that the boiler is not blown down regularly and periodically.

The present invention solves both these problems by adding chemical automatically and periodically, and by setting up an alarm, with each chemical addition cycle, which is silenced only by the manual blow down operation.

Another improvement of the invention is that it operates upon the rate change in temperature in the blow down line, rather than, as in some prior devices, depending on the sensing of an absolute temperature. That is, the circuitry responds to a rapid increase and a rapid decrease in this temperature which indicates the blowing down operation. This is more reliable than a straight transmitting thermometer or the like which senses an absolute temperature.

The invention circuitry provides means to activate remote signals to alert when blow down is required, provides an integral flashing light, bell and alarm system, while at the same time providing a highly reliable circuit to accomplish the above.

The invention circuitry is itself divided into two parts, a line voltage AC circuit which operates the various alarms, lights and flashers, and a low voltage DC control portion operated by the temperature means in the blow down line. These two portions are conveniently interconnected by a transformer and diode for power purposes, and by relays having their coil on one side and some or all of their contacts on the other side of the invention circuitry. Thus the invention achieves both the advantages of AC higher voltage to operate conventional alarms and bells, and DC control circuitry.

The control circuitry comprises a differentiating circuit which overcomes the disadvantage of having to work with absolute temperature measurement. Leaky valves, irregularities in pipe, deposits, and the like, can have large effects of absolute temperature measurement, and such changes can have a detrimental effect on monitoring and control functions. By sensing the rate of change rather than any absolute value, the invention provides a more reliable function, does it more simply, and achieves great advantages over such prior methods and devices.

It is an important part of the improvement of the invention that it operates on the time rate of change of temperature rather than an absolute temperature and rather than even a large swing in temperature. For example, the same boiler could be operating at 100° F at one time of day and at 200° F at another part of the same day. This large change in temperature will not affect the invention blow down control means. However, when the boiler is blown down, typically, in a commercial installation, the temperature of the tailpipe could move from 100° to 200° during the blow down operation in about 10 seconds. It is this rapid time rate of change in temperature upon which the invention operates to achieve its improvements.

The invention has broader usage than the boiler control and blow down shown and described herein. For example, the invention could be used to monitor any line wherein the problem comprises detecting a rapid change in temperature, as opposed to an absolute temperature. For example, say a particular pipe could be used to carry water at various different temperatrues or steam at various different temperatures or other substances at various different temperatures, at different times. And further it could be assumed that whenever it is carrying one temperature material it is important that there be no material of a different temperature present. In such case, an absolute temperature sensor would not work because the total service to which the line is put would sometimes normally include materials at many different temperatures. However, the invention could be always present on that line and, would not be triggered so long as, for example, only cold water was present, or only hot steam was present, but would be triggered if cold water should suddenly appear in a steam line, or vice versa. The invention could also be used with gases as well as liquids, such as for example, on smoke stacks or chimneys or ovens or the like. For example a failure in the insulation of an oven might produce a rapid decrease in temperature which the invention is well adapted to sensing. Other such applications will be evident to those skilled in the various arts to which the invention pertains.

Figure 2:
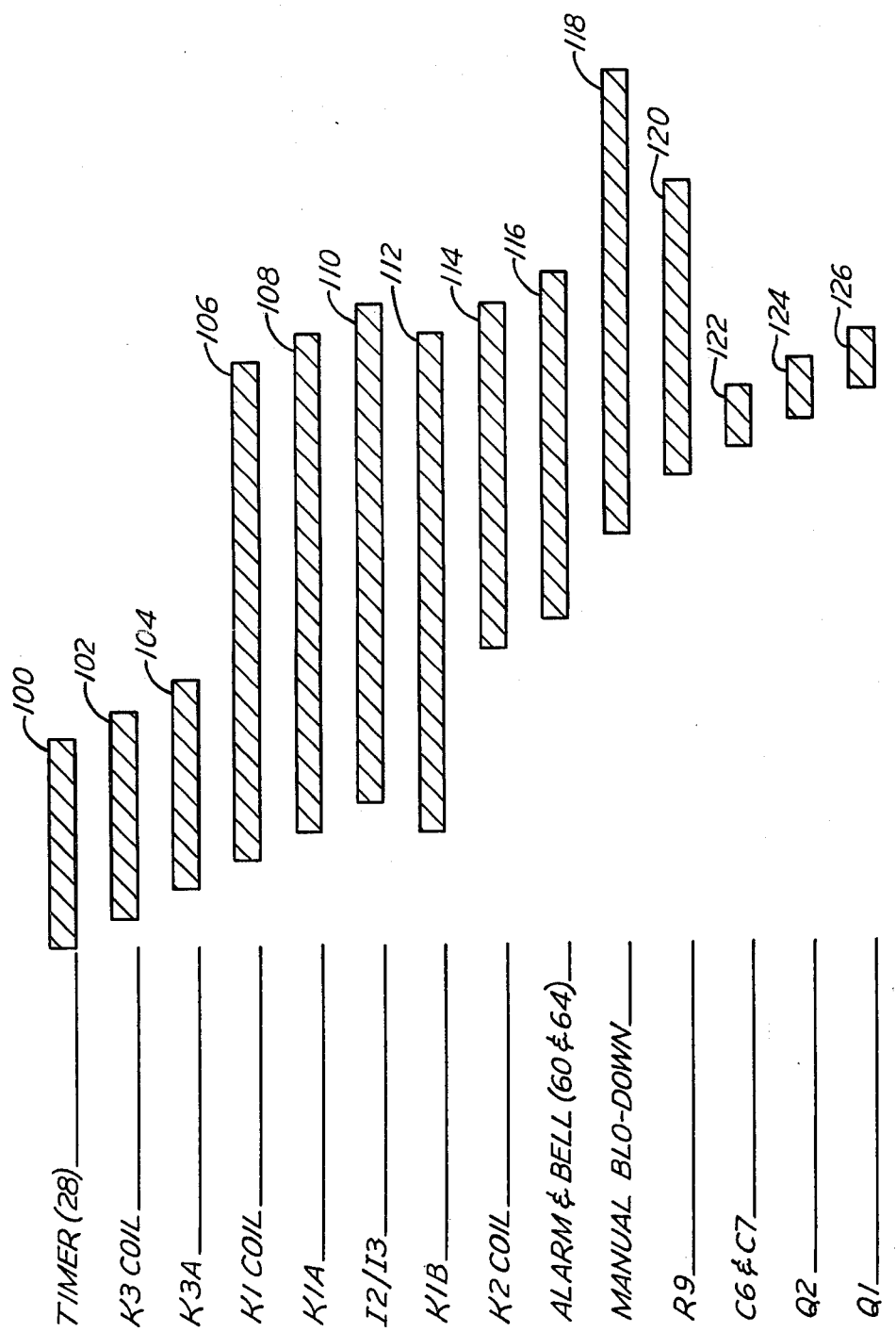

The above and other advantages of the invention will be pointed out or will become evident in the accompanying drawing also forming a part of his disclosure, in which:

FIG. 1 is a schematic diagram of the preferred embodiment of the invention, and FIG. 2 is a timing chart illustrating the operation of the circuit.

Referring now to FIG. 1, the preferred embodiment of the circuit 10 is made up of a "front end" power, chemical pump, and timing portion 12; an AC portion 14, and a DC control portion 16. The portions 14 and 16 are interconnected by a transformer 18.

Front end 12 comprises a source 20, which may comprise simply the conventional 115–120 VAC power supply. Power line 22 extends from the source 20 and contains a fuse 24. A common line 26 also extends from source 20. A light I1 is connected across the source 20 to indicate "power on." A main on-off switch can also be included at this point, as is obvious, if desired. A clock type timer 28 is connected across the power lines 22 and 26, and the contacts 30 thereof interconnect the "hot" line 22 to a line 32 when the clock 28 closes the contacts 30. That is, the switch 30 is normally not connecting the lines 22 and 32 together, but only does so for the predetermined periods and at the times set on timing means 28. Such clocks with adjustable tripper devices to predetermine the on period and the location of the on period in a 24-hour cycle, and further including more sophisticated devices to skip a day(s) within a week, and the like, are very well known and need not be described in any further detail herein.

Power line 22 is tapped off between fuse 24 and contacts 30 and extends to the common point of a relay contact K1A, and also connects to the primary side of the transformer 18. The circuit is completed through the primary side of transformer 18 via common line 26. Thus transformer 18 is energized whenever the power is on independently of timer 28.

Line 32 contains a parallel array of a chemical pump 34 and an indicator light I4. After the elements 34 and I4, line 32 contains the coil of a relay K3 and ends at common line 26. The breaks in the lines leading from pump 34 into line 32 indicate the facts that the chemical pump is optional, and further may be located remotely or at the same location as the invention. The same breaks appear and the above comments apply in regard to the remote blow warning 46 and the remote bell 64. The dash line running between the clock 28 and its contact 30 indicates a physical connection between these two parts. This same technique is sometimes used in other parts of the drawing. The nomenclature, however, is internally consistent; that is, relay K1 has contacts K1A, K1B, etc. In regard to all relay contacts and the contact 30 of the clock 28, FIG. 1 shows all such contacts in their normal position; that is, in an unactivated state.

In its activated state, relay contact K1A connects power line 22 to point 36. Two lines, 38 and 40, extend from point 36 to deliver power to the remainder of the AC portion 14. Line 40 contains a blow down flasher light I2, and terminates at point 42. The remaining portions of the AC portion 14 all tap off of line 38 and point 42. These portions comprise a line 44 extending from point 42 which runs to a remote blow down warning device 46, which may be a light, bell, whistle, combinations of the above, or the like, as is conventional. Line 48 completes the circuit from device 46 to the common line 26. A line 48 containing a resistor R10 extends from line 42 to common line 26. Resistor R10 is a load resistor for light I2.

Finally, a pair of lines, 50 and 52, extend from point 42 to common 26. Line 50 contains a pair of junction points D and E and a second blow down flasher light I3 similar to light I2. Line 52 contains a flasher device 54 which is connected to both line 38 and point 42, as shown. The nature of flasher 54 is such that when the relay contact K1A closes the two lights I2 and I3 will flash on and off alternately. The jumper pair points D and E, and F and G serve to add flexibility to the invention by permitting the bypassing of the flasher device 54. If it is desired to remove the flashing device 54 or if it should malfunction and require removal, then a jumper can be put across the points F and G and the lights I2 and I3 will operate in a steady mode. In normal operation, a suitable resistor is put across the points D and E, and points F and G are left unconnected, to achieve the flashing mode of operation.

Line 38 also connects to the common points of a pair of relay terminal contacts K2B and K2A. The active point of contact K2B connects to a line 58 which contains alarm 60, and then connects to common 26. The active point of relay contact K2A is connected to line 62 which runs to remote bell device 64 which is thence connected by a line 66 to common 26.

The DC control portion 16 is connected to the secondary side of the transformer 18 by a pair of lines 68 and 70. The line 68 contains a rectifying device in the form of a solid state diode D1. Thus, line 68, together with its various branches, comprises the power supply side of the DC portion 16.

Line 72 runs between lines 68 and 70 and contains a resistor R2 and a capacitor C1 arranged in series circuit for the purpose of providing filtered DC supply to the DC portion of the invention circuit.

After line 72, line 68 branches off into three power lines 74, 76 and 78. Line 78 terminates at the common point of a relay contact K1B; line 76 at the activated terminal of a relay contact K3A, and line 74 contains a resistor R8 and thence goes on to supply several portions of the control circuitry as will be set forth below. The active terminal 80 of the relay contact K1B is connected by a line 82 to the common 70, and contains a series circuit of a resistor R11 and a capacitor C3. R11 and C3 serve as a safety to assure the proper operation of the circuitry when Q1 fires to short out the coil of the relay K1. Relay contacts have a tendency to "chatter," that is to momentarily reclose during an opening cycle. The presence of the capacitor C3, which is charged through the resistor R11 while the circuit is activated, discharges when Q1 fires, thus preventing any chatter on the relay contact K1B from reactivating the coil of the relay K1.

The common terminal 84 of relay contact K3A is jumpered to active terminal 80, and is also connected to a line 86 containing a series circuit of a resistor R3 and the coil of the relay K1. Coil K1 is connected in parallel circuit with a controlled rectifier Q1 via a line 88. The gate terminal of Q1 is connected to a line 90 which branches, one branch going to line 70 and containing a capacitor C2, and the other line containing a series array of the resistors R4 and R5 before connecting to the ground line 70.

A transistor Q2 is provided for the purpose of controlling the operation of controlled rectifier Q1. Line 74, previously described, connects to the collector of transistor Q2, and the emitter thereof is connected to a point between the resistors R4 and R5. The base of transistor Q2 is connected to a line 94 which extends to a differentiating circuit comprising a parallel array of two capacitors C6 and C7, arranged between an array of two resistors R6 and R7. One capacitor in place of the two capacitors C6 and C7 could also be used. A line 96 contains the resistor R7 and one end of each of the two capacitors C6 and C7, and this line also contains a temperature responsive resistor R9. R9 is mounted on a heat sink, such as a block of aluminum. The heat sink was needed because of the characteristics of the particular device R9 which was used. This device has the capability of self-heating, and the heat sink was required to prevent it from "running away" with itself. Other devices, or a larger thermistor, might not need such a heat sink. In the successfully constructed embodiment, R9 was a Fenwal thermistor, 10K ohms resistance, their Part No. FA41J1; C6 and C7 were 250 MFD each, R7 was 4.7K ohms, and R6 was 1M ohms.

Resistor R9 is in series circuit with a resistor R7. A line 98 contains a Zener diode D2, arranged between the power lines 70 and 74. The Zener diode D2 acts together with the resistor R8 to supply a regulated DC voltage to all of the remaining circuitry. The dotted line showing of the capacitor C5 between lines 74 and 70 for the capacitor C4, are provided as optional features. That is, these two capacitors might be required where the operating environment is electrically severe. That is, a great amount of transients, spurious pulses, and the like might be present, in which case the optional capacitors would be needed to obviate any detrimental effects such "static" might have on the operation of the invention.

OPERATION

The operation of the invention can best be understood in conjunction with the timing bar diagram of FIG. 2. Some general comments with regard to FIG. 2; time is represented on the X or horizontal scale, and the steps between bars (for example the even steps between the bars 106, 108 and 110 at their right ends) are indicative of the fact that these events occur seriatim, in cascade fashion, one after the other. In matter of fact, the mode of operation is so rapid that these events, to the naked eye or the ordinary observer, seem to occur simultaneously.

Assuming the power is on, lines 22 and 26 are activated. All relay contacts are in the positions shown in FIG. 1 in their unactivated condition. The time clock 28, in accordance with the pre-determined settings on its tripper switches first closes switch 30 to activate pump 34 and light I4. At the same time relay K3 coil is activated in line 32, which operates its contacts K3A connecting power line 76 to lines 80 and 86. The transformer 18 is always "live," because of line 22 being connected before the contacts 30. Closing of this contact K3A activates the coil of relay K1, closing all of its contacts. The operation of the contacts K1A causes the flasher lights I2 and I3 to commence alternately flashing under the control of device 54, points D and E but not F and G being suitably connected together.

The contacts K1B also close at this time, which completes a holding circuit for the relay coil K1 comprising line 78, contacts K1B now in the down position, point 80, line 86, and thence to power line 70. The flashing lights I2 and I3 indicate to the operator that he should perform the manual blow down operation. However, relay K2 has not yet been operated, and therefore the bell 64 and alarm 60, which are controlled by the contacts K2B and K2A, are not yet activated. The remote blow warning 46, however, has been operated at the same time as lights I2 and I3. This remote blow warning can be a flasher light, whistle, horn, or any other indicia to the operator that manual flow down is required.

For purposes of this explanation, let it be assumed that the operator fails to perform the manual blow down. At the end of the pre-determined time period during which the pump 34 is to operate the clock will return the switch 30 to the position shown in FIG. 1. That action will disable relay K3, causing contacts K3A to return to the FIG. 1 position. Contacts K1B and the other K1 contacts, are all in the position opposite that shown in FIG. 1, due to the holding circuit for coil K1. In this configuration, a circuit is established to activate the coil of relay K2 from line 70, through resistor R1, coil K2, the now returned relay contact K3A, line 86 to point 80, thence through still activated relay contact K1B, line 78, and to the power line 68. Activation of relay K2 operates alarm 60 and remote bell 64 via lines 58 and 62 respectively. Meanwhile, the remote warning 46 as well as the flashers I2 and I3 continue to operate because of the continued activated condition of the relay K1.

This sequence of events is demonstrated graphically by the bars 100 through 116 inclusive of FIG. 2. The relationship between the end of the bar 100 when the timer switch is off to the beginning of the turning on of relay coil K2 is the significant point at this time.

In order to turn off the alarms, lights, etc., the operator must perform the manual blow down operation. This is part of the boiler, now shown, being controlled by the invention. The only additional change made in that boiler is in the mounting of the thermistor R9 on the tailpipe of the boiler, or other position wherein it can sense the temperature change caused by the blow down operation.

Resistor R9 is a temperature sensitive resistor known as a thermistor. When DC power is initially applied to the resistor network R7 and R9, the capacitors C6 and C7 charge through resistor R9, so that after approximately one minute, the voltage across the capacitors C6 and C7 equals the voltage drop across resistor R7. This is the steady state condition of this part of the circuitry.

Line 118 of FIG. 2 indicates that the operator has blown down the boiler. Resistor R9 suddenly heats up and decreases in electrical resistance. This reduced resistance causes an increase in the voltage between the junction of resistors R7 and R9, which increased voltage passes through the differentiating circuit of the capacitors C6 and C7 operating together with the resistor R6.

In short, the reduced resistance of device R9 in response to the boiler blow down operation causes a difference in voltage to appear between R7 on the one hand and C6 and C7 on the other hand. This difference appears on the resistor R6 which had previously been at zero voltage when the device was in steady state operation. This voltage on the resistor R6 is enough to fire the transistor Q2. It is noteworthy that only a relatively rapid change in the difference between the voltage on R7 as compared to the voltage C6 and C7 will generate this voltage on resistor R6. Normal relatively slow changing voltages will not produce the voltage on the resistor R6, because of the time constant of the array of components R7, C6, C7 and R6. This is the manner in which the differentiating circuit, or a circuit responsive to the time rate of change rather than change per se, is provided by the invention.

The above is important to the versatility of the invention. This part of the circuit, resistors R6 and R7 and capacitors C6 and C7, with the input signals being provided with the thermistor R9 or any other input device, and with the output being present on line 94 to operate controlled rectifier Q2, or any other suitable output device, is a sub-combination of the invention. This portion comprises means to produce an output signal in response to a predetermined rate of change at the input means, more specifically, to produce an output in response to a predetermined relatively rapid change in the temperature being detected. Of course, a transducer other than a thermistor could be used to produce an electrical input signal in response to some other phenomenon. For example, the phenomenon to be monitored could be changes in pressure with a suitable pressure/electrical device being used as the transducer. Other equivalent devices for other phenomena also could be used, as will be evident to those skilled in the appropriate arts.

An amplification occurs through transistor Q2, which in turn causes a pulse on the line 90 to the gate of the controlled rectifier Q1. This causes Q1 to fire or conduct across line 88, which conduction in effect "shorts out" the coil of relay K1. When K1 returns to the deactivated FIG. 1 condition, the holding circuit is broken, all other contacts have previously returned to their FIG. 1 deactivated state and are ready for another cycle. The remaining bars 120, 122, 124 and 126 on FIG. 2 indicate this latter sequence of events. The end point of the bar 120 of the operation of the thermistor R9 is not critical. Similarly, the lengths of the bars 122, 124 and 126 are not critical, and in fact are extremely short due to the solid state nature of these components.

FIG. 2 and the above explanation is the most difficult condition; i.e., a situation where the timer 28 times out and the blow down has not been performed. In a more normal case, the operator will be alerted to perform the manual blow down operation during the period of operation of the pump 34.

The timer 28 contains pins and settings to control the operation of the pump 34. In typical installations the chemical pump will be caused to operate for a period of time from a few minutes to perhaps a half hour depending upon various parameters around a particular installation.

In such case, that is, the more normal situation, when the blow down operation is performed while the contact 30 is in its up or activated state, the alarm 60 and bell 64 will not operate. This is so because the circuit sequence through resistor R9, the differentiating circuit R6, C6 and C7, Q2 and finally Q1, will remain activated, thus holding coil K1 deactivated, maintaining K1B in its FIG. 1 position. K3A will be in the down or activated position supplying power from line 76 to line 86. However, this will not cause the alarms to operate because of the activated state of the controlled rectifier Q1. When the clock 28 times out, the solid state devices Q2 and Q1 will be reset to their FIG. 1 "ready" condition. The capacitor C2 is analagous to the capacitors C4 and C5; i.e., it serves a transient suppression function.

While the invention has been described in detail above, it is to be understood that this detailed description is by way of example only, and the protection granted is to be limited only within the spirit of the invention and the scope of the following claims.

What is claimed is:

1. In combination with blow down means for a boiler, an electrical device adapted to sense changes in the fluid in said boiler blow down means being monitored and to produce an electrical signal in response to such temperature changes, circuit means adapted to receive said signal from said device, at least one alerting means, and said circuit means comprising means interconnecting said electrical device and said alerting means in such a manner that said alerting means are activated only when said temperature undergoes a predetermined relatively rapid change.

2. The combination of claim 1, said electrical device comprising a thermistor.

3. The combination of claim 1, said interconnecting circuit means comprising means to hold said alerting means activated and a controlled rectifier connected in parallel with said holding means, the gate terminal of said controlled rectifier being connected to the output of said electrical device via a differentiating circuit portion of said circuit portion of said circuit means in such a manner that said rapid change in temperature sensed by said device causes said controlled rectifier to conduct to in turn cause said holding means to disable said alerting means.

4. The combination of claim 3, said differentiating circuit portion comprising an array of resistor means and capacitor means having values selected to produce a time constant which will set the relatively short period of time within which said predetermined temperature change will activate said alerting means.

5. A method of producing an output signal in response to only a predetermined relatively rapid change in the temperature of a boiler blow down means, comprising the steps of of detecting said temperature, transducing the detected temperature into an electrical signal, inputting said signal to circuit means, selecting said circuit means such that its time constant is proportional to said predetermined relatively rapid change in said temperature, and producing an output signal from said circuit means in response to said predetermined relatively rapid change in said temperature.

6. The method of claim 5, wherein said transduced electrical signal is produced with the use of a thermistor.

7. The method of claim 5, wherein said selected circuit means comprises resistance-capacitance in a differentiating circuit.

8. A method of monitoring the blown down condition of a boiler comprising the steps of sensing the temperature of the boiler blow down means, producing an electrical signal proportional to said sensed temperature, supplying said signal to circuit means, and selecting the values of the elements in said circuit means such that said circuit means will produce an output when said blown down means temperature undergoes a predetermined rapid change.

9. The method of claim 8, wherein said temperature is sensed with a thermistor.

10. The method of claim 8, wherein said selected value circuit elements comprise the resistances and capacitances in a differentiating resistance-capacitance circuit.

11. In combination with a boiler having blow down means, the improvement comprising an electrical device adapted to sense the temperature change in the blow down means caused by the blowing down operation and to produce a signal in response to such temperature change, timing means adapted to activate parts of the circuit at pre-determined times and for predetermined intervals of time, first and second alerting means; circuitry interconnecting said electrical device, said timing means and said first and second alerting means in such a manner that said first pre-determined on-time controlled by said timing means and said second alerting means are activated if said boiler is not blown down during said first pre-determined on-time, said circuitry further including means to hold said alerting means in an activated condition until a boiler blown down temperature change is sensed by said electrical device.

12. The combination of claim 11, said electrical device comprising a thermistor.

13. The combination of claim 11, said timing means comprising a continuously driven time clock having adjustable tripper members.

14. The combination of claim 11, said first alerting means comprising at least one light, means to cause said light to flash, and further comprising means to connect optional warning devices in parallel with said flashing light.

15. The combination of claim 11, said second alerting means comprising an alarm, and further comprising an optional remote bell device connectable to said circuitry in parallel with said alarm.

16. The combination of claim 11, said circuitry comprising means to connect a chemical pump to pump chemicals into the makeup water into said boiler in parallel with said timing means, whereby said chemical pump operates under the control of said timer and at the same time as said first alerting means.

17. The combination of claim 11, said circuitry between said timing means and said electrical device comprising means including a relay to hold said second alerting means activated even after said timing means completes its pre-determined on time, said circuitry including a controlled rectifier connected in parallel with the coil of said relay and the gate terminal of said controlled rectifier being connected to the output of said electrical device via a differentiating circuit portion of said circuitry in such a manner that the change in temperature sensed by said device causes said controlled rectifier to conduct, whereby said relay coil is shorted out, whereby said first and second alerting means are disabled.

18. The combination of claim 16, said circuitry comprising a first AC portion including said first and second alerting means, said circuitry including a second DC portion including said electrical device and said solid state control elements, said first and second portions being interconnected by a transformer and by at least one relay having its coil in one of said portions and its contacts in the other of said portions, whereby the control functions can be operated at relatively low voltage direct current, and the alerting means can be operated at relatively high voltage alternating current.

* * * * *